…

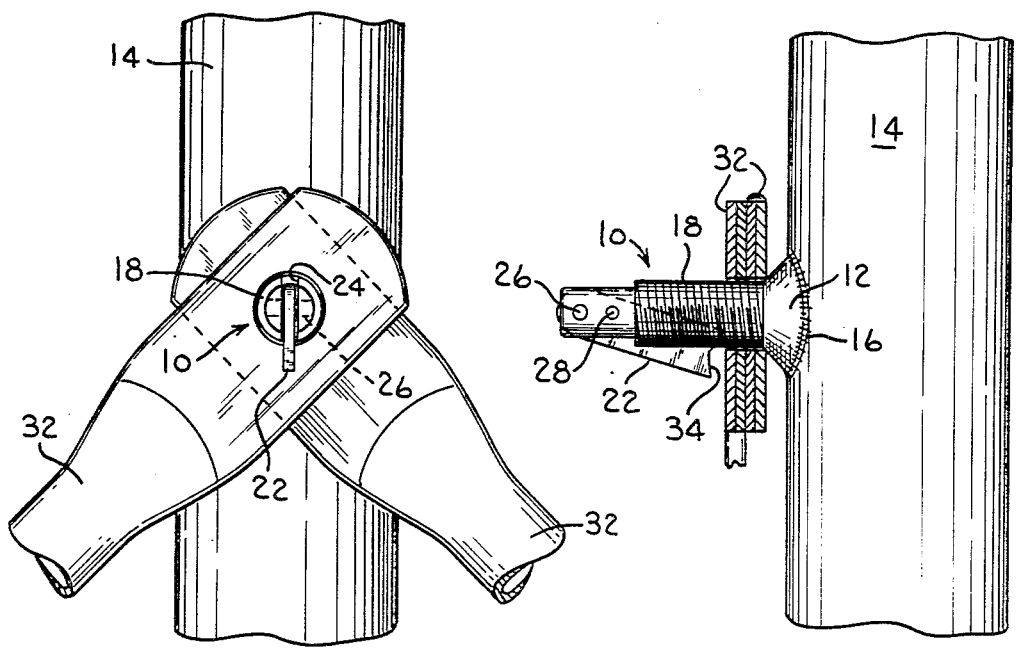
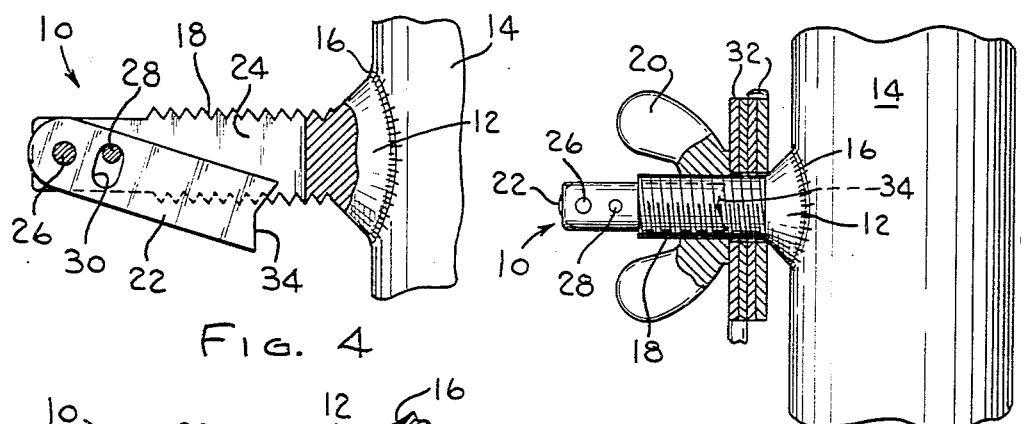
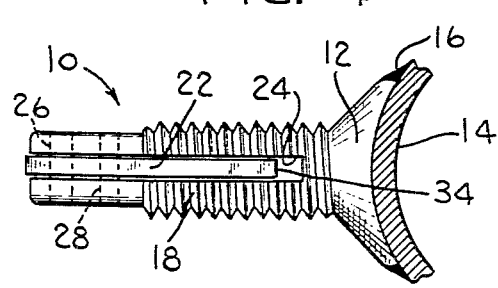

United States Patent Office

2,698,552
Patented Jan. 4, 1955

2,698,552
STUD

David G. Smith, Milwaukee, Wis., assignor to Safway Steel Products, Inc., Milwaukee, Wis., a corporation of Wisconsin Application May 8, 1952, Serial No. 286,737

1 Claim. (Cl. 85—3)

This invention relates to a stud which permits of rapid assembly of parts. The present stud has been designed for use in scaffolding and the like, but it will be apparent that the stud may be used in other environments.

The purpose of this invention is to speed up assembly and disassembly of scaffolding by simplifying the connections between the various structural elements. In the past it has been customary to connect braces to the major strength members by means of wing nuts threaded on studs mounted on the strength members. Wing nuts may be used with the present stud, when desired, with much greater speed due to the provision of a smooth pilot portion ahead of the threads to facilitate starting the nut on the threads. The pilot portion aligns the nut with the threads and, by preventing "cocking" the nut and consequent inability to turn the nut on the stud, makes starting the nut so easy that a man wearing gloves or mittens can readily effect the connection.

The present stud affords an alternative method of connecting the braces to the stud. The stud is provided with a latch which allows the apertured ends of braces to be moved axially down the stud and then engages the braces to prevent removal of the brace. The latch may be rendered inoperative manually very easily when disassembling the scaffold. The latch does not interfere with the use of a wing nut and, in fact, the latch simplifies the assembly even when using the wing nut by retaining the braces on the stud until the nut has been started on the threads.

An object of this invention is to provide a stud which makes possible more rapid connections.

A further object of this invention is to provide a stud which aligns the nut with the stud threads to insure proper thread engagement every time a nut is started on the stud.

Still another object of this invention is to provide a nut which effects the above objects and may be produced at low cost.

Other objects and advantages will be pointed out in, or be apparent from, the specification and claim, as will obvious modifications of the single embodiment shown in the drawings, in which:

Fig. 1 is an elevation showing two braces retained on a stud by means of the latch;

Fig. 2 is a side view of the structure shown in Fig. 1;

Fig. 3 is similar to Fig. 2 but shows a wing nut retaining the braces on the stud;

Fig. 4 is a vertical section through a stud; and

Fig. 5 is a plan view of the stud.

Referring to the drawings in detail, the stud 10 is provided with a generally conical base 12 which is shaped to conform to the exterior of major strength member 14 to which it is secured by weld 16. About two-thirds of shank 18 is threaded and the tip is unthreaded. The unthreaded tip has a diameter which is no greater than the root diameter of the threaded part of the shank. When thus formed the tip coacts with the threads or wing nut 20 to align the nut with the threads on the shank and to insure proper threading of the nut on the stud on the first start. This reduces the chances of dropping the nut and so simplifies the operation that it may be performed with ease with mittens on. The differential between the tip diameter and the thread root diameter may be selected to prevent too snug a fit while avoiding freedom such as would permit misalignment of the threads.

The horizontally disposed stud has a latch 22 located in vertical slot 24 and pivotally mounted on pin 26 adjacent the tip of shank 18. A stop pin 28 passes through slot 30 in the latch to limit movement of the latch out of shank slot 24, as may be seen in Fig. 4. The width of latch 22 is such that the latch may lie wholly within the cross section of the shank to allow a wing nut to be threaded on the shank and to allow the apertured ends of braces 32, 32 to pass down the stud. As may be seen in Fig. 2, the two braces may be moved to the base end of the stud at which time gravity will move the latch downwardly to prevent removal of the braces until the latch is manually moved into shank slot 24. The braces may be retained on the stud solely by latch 22 or a wing nut may be used. In the latter case the latch serves to hold the braces on the stud until the nut is started on the stud threads, thus facilitating the assembly. As the nut moves down the stud it will, of course, move the latch back into its slot.

It will be noted that the length of the latch is selected to prevent operation of the latch even when the nut is turned down on the stud to contact the base. In other words, the free end of the latch lies closer to the stud base than the most remote nut threads when the nut contacts the base. Obviously, it would be undesirable to have the latch prevent removal of the nut.

The free end of the latch is provided with a V-shaped notch 34, the apex of which faces the pivot pin. When the latch is in its limit position (Figs. 2 and 4) the exposed notch face is generally vertical to resolve any axial force exerted thereagainst by the brace 32 into a force tending to move the latch against its stop rather than tending to push the latch back into slot 24. While any such axial force is small the above expedient prevents accidental release of the braces. The V-notch allows the strength member to be rotated 180° without affecting the efficacy of the stud and avoids ascertaining the "top side" of the stud in fabrication as would be necessary if the free end of the latch were merely cut on a diagonal. If the strength member 14 were to be used in a horizontal position rather than vertical it will be appreciated that the stud would be rotated 90° so the slot 24 would remain vertical.

The latch method of assembly is particularly advantageous where the scaffold is erected on a temporary basis. To avoid too much freedom of the brace ends, the stud should be designed for a predetermined use. Thus, the illustrated form is designed for two brace ends. One brace end could be used but three would prevent operation of the latch. If it were necessary to employ a third brace, the use of a wing nut would then be indicated. By providing these alternative assembly methods, the only possible limitation on the latching stud is removed.

The nature of scaffold parts allows the stud to be mounted with slot 24 vertical so that gravity may bias the latch into its operative position. If desired a spring could be employed to bias the latch but is unnecessary and an unwarranted expense in the present case. Other design variations will occur to those skilled in the art and I therefore wish to be limited only by the scope of the claim.

I claim:

A stud having a shank and a base at one end of the shank adapted for connection to a structural member, said shank having a diametrical slot extending lengthwise thereof throughout a substantial portion of its length and terminating at one end adjacent to the base, a pin carried by the shank and extending transversely across said slot, a latch member pivoted adjacent to one of its ends on said pin and having its other end free and swingable within said slot between the pin and the base, said latch member being shorter than the length of the slot and the free end of the latch member terminating in spaced relation to the plane of said base, said latch member being dimensioned transversely to lie substantially within said slot in one position and in another position to lie with its free end at least partially projecting beyond the confines of the body of the shank near the base, and means for so limiting the movement of the latch member, the latch member being shaped at its free end to afford an abrupt abutment surface transversely of the shank and latch member and facing the base, the slotted portion of the shank adjacent to the base being threaded and the other end of the shank being unthreaded, the transverse dimension of the latch member and the diameter of the unthreaded portion of the shank being no greater than the root diameter of the threaded portion of the shank whereby said unthreaded portion of the shank may serve as a pilot for a nut to be threaded on the shank.

References Cited in the file of this patent

UNITED STATES PATENTS

| | | |
|---|---|---|
| 995,881 | Loop | June 20, 1911 |
| 1,950,290 | Benson | Mar. 6, 1934 |
| 2,429,833 | Luce | Oct. 28, 1947 |
| 2,561,938 | Meng | July 24, 1951 |
| 2,611,422 | Roney | Sept. 23, 1952 |

FOREIGN PATENTS

| | | |
|---|---|---|
| 19,448 | France | Oct. 19, 1914 |

(1st Addition to No. 473,206)